(12) United States Patent
Finch

(10) Patent No.: US 7,996,557 B2
(45) Date of Patent: *Aug. 9, 2011

(54) METHOD AND APPARATUS FOR MULTI-PHY COMMUNICATION WITHOUT AN ATM BUS MASTER

(75) Inventor: William R. Finch, Austin, TX (US)

(73) Assignee: Zarlink Semiconductor (U.S.) Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/546,486

(22) Filed: Aug. 24, 2009

(65) Prior Publication Data

US 2009/0313409 A1    Dec. 17, 2009

Related U.S. Application Data

(63) Continuation of application No. 09/844,747, filed on Apr. 25, 2001, now Pat. No. 7,594,026.

(51) Int. Cl.
  *G06F 15/16* (2006.01)
(52) U.S. Cl. ....................................................... 709/237
(58) Field of Classification Search .................. 709/238, 709/227–229, 236–237, 250; 710/105–107, 710/5, 10; 370/229–240
See application file for complete search history.

(56) References Cited

U.S. PATENT DOCUMENTS

| | | | | |
|---|---|---|---|---|
| 4,451,886 A * | 5/1984 | Guest et al. | ................ | 710/105 |
| 5,029,124 A * | 7/1991 | Leahy et al. | ................ | 710/105 |
| 5,280,482 A * | 1/1994 | Kitamura et al. | ............. | 370/458 |
| 5,280,623 A * | 1/1994 | Sodos et al. | .................. | 710/105 |
| 5,412,783 A * | 5/1995 | Skokan | ......................... | 710/105 |
| 5,455,916 A * | 10/1995 | Bourke et al. | ................ | 710/105 |
| 5,509,124 A * | 4/1996 | Bourke et al. | ................ | 710/100 |
| 5,548,732 A * | 8/1996 | Hoashi et al. | ................ | 710/105 |
| 5,572,684 A * | 11/1996 | Canik et al. | ................... | 710/106 |
| 5,590,369 A * | 12/1996 | Burgess et al. | ............... | 710/110 |
| 5,812,881 A * | 9/1998 | Ku et al. | ......................... | 710/71 |
| 5,898,886 A * | 4/1999 | Hewitt | ............................ | 710/70 |
| 5,905,879 A * | 5/1999 | Lambrecht | .................... | 710/117 |
| 6,122,683 A * | 9/2000 | Ku et al. | ......................... | 710/71 |
| 6,618,376 B2 * | 9/2003 | Rumer | ........................ | 370/395.1 |
| 6,763,413 B2 * | 7/2004 | Oh | ................................. | 710/107 |
| 6,763,437 B1 * | 7/2004 | Nguyen et al. | ................ | 711/147 |

* cited by examiner

*Primary Examiner* — Krisna Lim
(74) *Attorney, Agent, or Firm* — Williams, Morgan & Amerson, P.C.

(57) ABSTRACT

A communication system includes a bus, first and second devices coupled to the bus, and a handshaking unit. The bus includes at least one data line and control lines. The data line is coupled between the first and second devices. The handshaking unit is coupled to the control lines of the bus and is adapted to determine if the first and second devices are capable of completing a data transfer and enable the first and second devices to facilitate the data transfer. A method for interfacing first and second devices coupled to a bus is provided. The bus has at least one data line coupled to the first and second devices and control lines. The method includes determining if the first and second devices are capable of completing a data transfer based on the control lines; providing handshaking signals on the control lines to enable the first and second devices; and transferring the data over the data line in response to the handshaking signals.

23 Claims, 4 Drawing Sheets

METHOD AND APPARATUS FOR MULTI-PHY COMMUNICATION WITHOUT AN ATM BUS MASTER

CROSS-REFERENCE TO RELATED APPLICATION

This is a Continuation Application of U.S. application Ser. No. 09/844,747, filed Apr. 25, 2001 now U.S. Pat. No. 7,594,026.

BACKGROUND OF THE INVENTION

1. Field of the Invention

This invention relates generally to communications systems and, more particularly, to a method and apparatus for multi-PHY communication without an ATM bus master.

2. Description of the Related Art

Packet switching communications networks, such as asynchronous transfer mode (ATM) communication networks, are typically made up of a number of communication nodes coupled for communication over a set of high speed communication links. Such a communication network enables communication among a wide variety of communication devices, including video, voice, data and facsimile devices. The topology of such a communication network enables a variety of communication paths to be established between any two communication nodes in the network.

An ATM arrangement consists of a plurality of protocol layers. The lowest protocol layer, the physical layer (PHY) incorporates the transceiver functions specific to the type of communications channel being employed. For example, the PHY layer may implement a variety of protocols for communication over a transmission medium connecting two devices. Such protocols include wireless, optical fiber, T1, T2, T3, etc. Above the PHY layer is the ATM layer, which is adapted to receive digital data, grouped in packets or cells, from the PHY layer.

To define the electrical interface between the PHY layer and the ATM layer, a Universal Test & Operations Interface for ATM (UTOPIA) specification was developed. The use of a standard interface allows the use of the upper ATM layers independent of the specific PHY layer implementation. Specific details on the UTOPIA interface are defined in UTOPIA Specification Level 1, Version 2.01 (af-phy-0017.000) available from The ATM Forum of Mountain View, Calif.

The UTOPIA level 1 specification defines an 8-bit parallel, synchronous bus with flow control. Communication is conducted in a point-to-point arrangement, where one master and one slave communicate. To increase the capabilities of the UTOPIA Level 1 protocol, the UTOPIA Level 2, Version 1.0 (af-phy-0039.000) specification was developed. UTOPIA Level 2 broadened the width of the interface to allow 16 bits to be used (i.e., optional), added address lines, and enabled multiple PHY devices to be placed on a common bus (M-PHY). In the M-PHY arrangement, an ATM master controls the flow of data on the bus. All communication is conducted between the individual PHY devices and the ATM master. If data from one PHY device is destined for another of the PHY devices on the same bus, the ATM master communicates with the first device, buffers the data, and then initiates a separate transaction to transfer the buffered data to the other PHY device. Only one PHY device at a time is allowed to drive the data and signal lines, as dictated by the ATM master.

One limitation of the M-PHY arrangement is that there is no capability to allow direct communication between PHY devices on the same bus. To meet the requirements of the various ATM specifications, an ATM master is typically highly complex and expensive. This expense limits the application in which an M-PHY arrangement is useful.

The present invention is directed to overcoming, or at least reducing the effects of, one or more of the problems set forth above.

SUMMARY OF THE INVENTION

One aspect of the present invention is seen in a communication system including a bus, first and second devices coupled to the bus, and a handshaking unit. The bus includes at least one data line and control lines. The data line is coupled between the first and second devices. The handshaking unit is coupled to the control lines of the bus and is adapted to determine if the first and second devices are capable of completing a data transfer and enable the first and second devices to facilitate the data transfer.

Another aspect of the present invention is seen in a method for interfacing first and second devices coupled to a bus. The bus has at least one data line coupled to the first and second devices and control lines. The method includes determining if the first and second devices are capable of completing a data transfer based on the control lines; providing handshaking signals on the control lines to enable the first and second devices; and transferring the data over the data line in response to the handshaking signals.

BRIEF DESCRIPTION OF THE DRAWINGS

The invention may be understood by reference to the following description taken in conjunction with the accompanying drawings, in which like reference numerals identify like elements, and in which.

Figure 1:
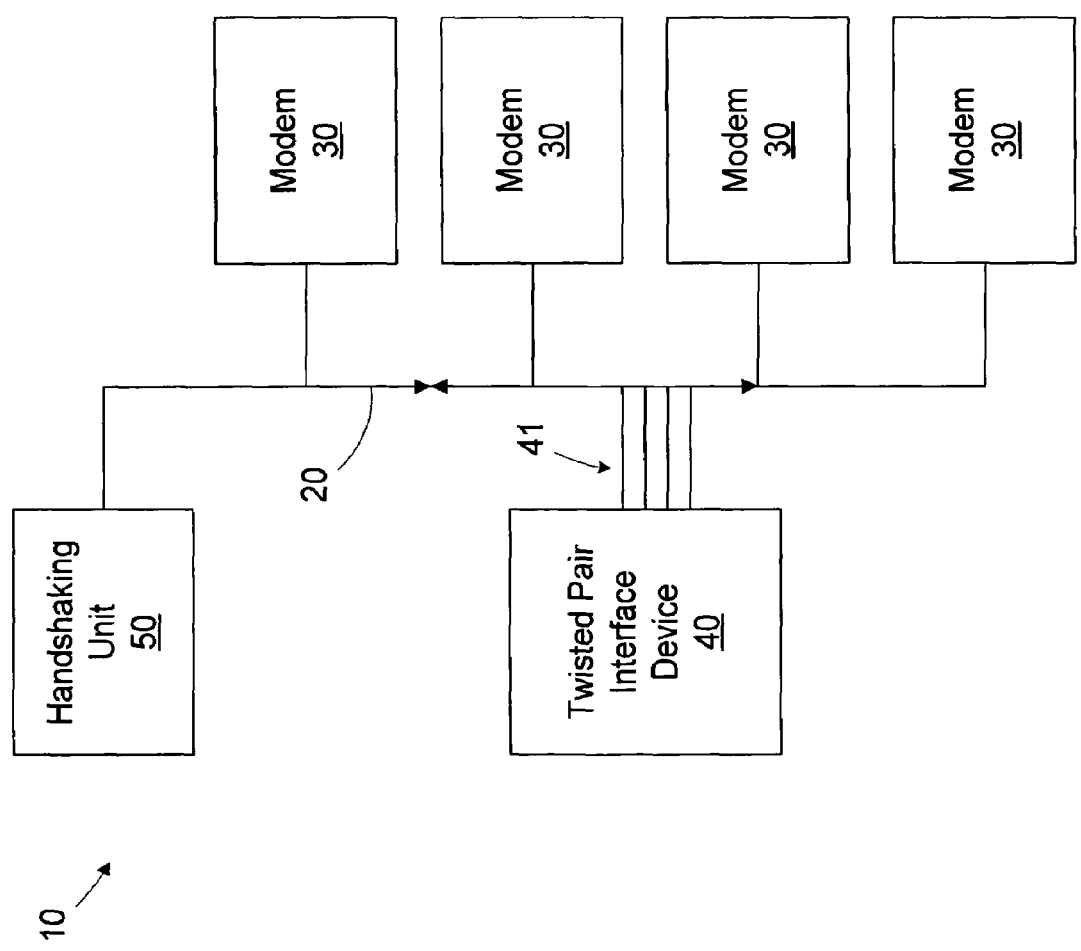
FIG. 1 is a simplified block diagram of a communications system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the Figures and, first, to FIG. 1, is a simplified block diagram of a communication system 10 in accordance with one illustrative embodiment of the present invention is provided. The communication system 10 includes a bus 20 that interconnects a plurality of modems 30 and an interface device 40 having a plurality of ports 41. The modems 30 are asymmetric digital subscriber line (ADSL) modems, such as an AmDSL135 available from Advanced Micro Devices. The modems 30 are ATM PHY devices. The twisted-pair interface device 40 is a four channel serial device capable of supporting a 25 MBPS connection. Each channel or port 41 of the interface device 40 is associated with one of the modems 30. The interface device 40 is also an ATM PHY device, such as an IDT77V1054 available from Integrated Device Technologies. The interface device 40 is designed to meet the "Physical Interface Specification for 25.6 Mb/s over Twisted Pair Cable" standard (af-phy-0040.000) available from ATM Forum. A handshaking unit 50 is provided for facilitating direct data transfers between the modems 30 and the interface device 40. In the illustrated embodiment, the handshaking unit 50 is a field programmable gate array, such as an XC4010XL FPGA offered by Xilinx.

Although the invention is illustrated as it may be implemented for linking the modems 30 to the interface device 40, its application is not so limited. The teachings herein may be applied to link any two PHY devices residing on a common bus.

Each modem 30 is assigned a unique address (e.g., 00, 01, 02, 03), and each port 41 of the interface device 40 is configured to respond to one of the addresses assigned to one of the modems 30. For example, one modem 30 and one port 41 of the interface device 40 both respond to the shared address 01. In the illustrated embodiment, the modems 30 and interface device 40 use an 8-bit interface and transfer data at a cell level. A typical ATM cell is 53 bytes, also referred to as octets, long and includes 5 header bytes and 48 payload bytes. Other arrangements, such as 16-bit widths and octet level data transfer are defined by the UTOPIA specifications and may also be implemented.

As described in greater detail below, the handshaking unit 50 determines if the interface device 40 has data to send to one of the modems 30 and if the modem 30 is capable of receiving the data (i.e., has an empty cell buffer). The shared addresses are driven on the bus 20 in a sequential polling fashion until a pending data transfer is identified. The handshaking unit 50 then enables the modem 30 and the interface device 40 to facilitate the data transfer. Unlike the prior art ATM M-PHY implementation employing an ATM Master, data is transferred directly between the two PHY devices. No intermediate buffering or negotiating steps are required.

Figure 2:
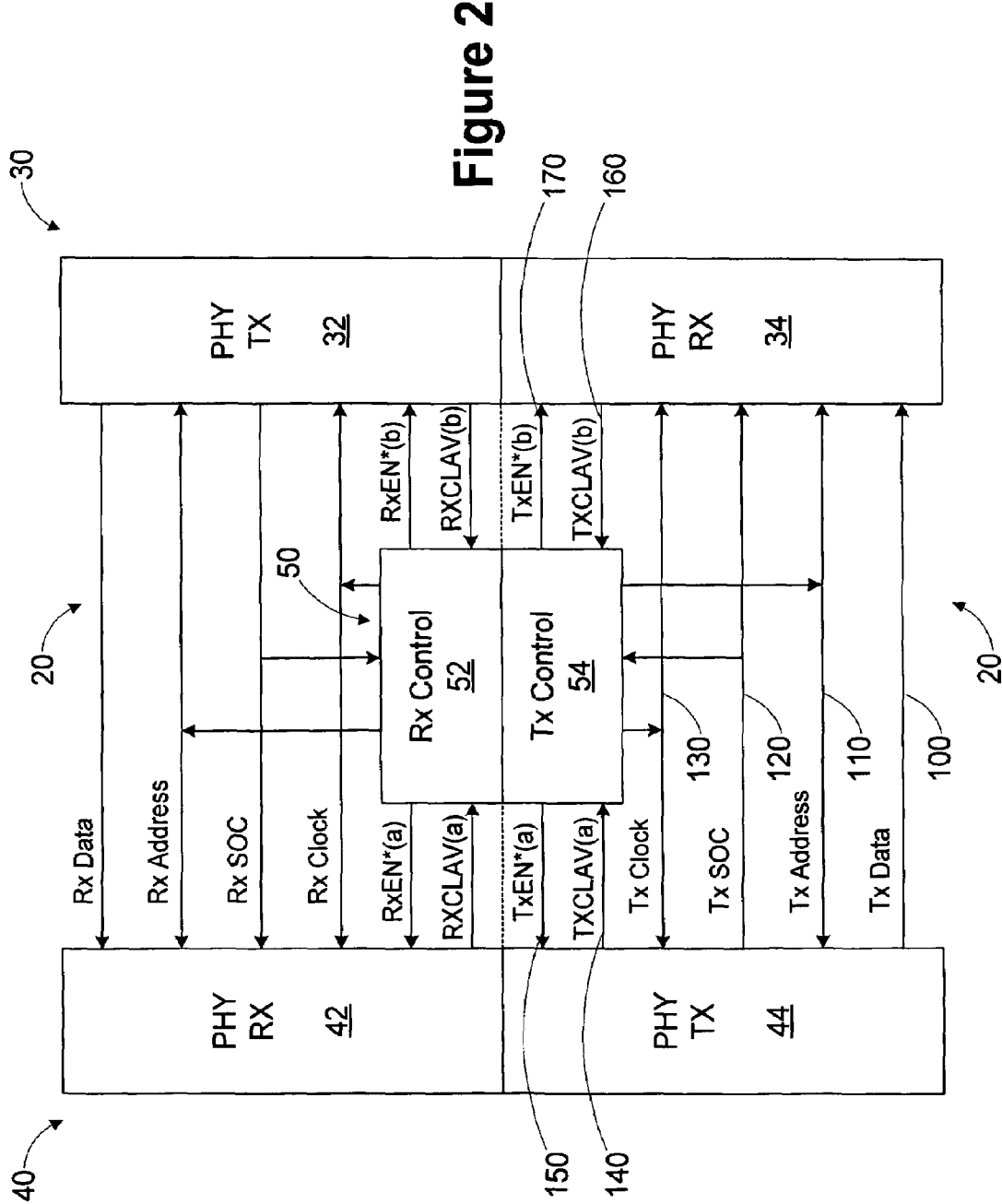
FIG. 2 is a simplified block diagram of two interfacing devices and a handshaking unit in the communications system of FIG. 1.

Turning now to FIG. 2, a simplified block diagram illustrating the interface between one of the modems 30 and one port 41 of the interface device 40 is provided. The modem 30 includes a transmit unit (PHY TX) 32 and a receive unit (PHY RX) 34. The interface device 40 includes a receive unit (PHY RX) 42 that interfaces with the transmit unit 32 of the modem 30 and a transmit unit (PHY TX) 44 that interfaces with the receive unit 34 of the modem 30.

The handshaking unit 50 includes a receive control unit 52 and a transmit control unit 54. The transmit path is defined to be from the interface device 40 to the modem 30, and the receive path is defined to be from the modem 30 to the interface device 40. The transmit and receive paths are completely independent, but are functionally equivalent. Accordingly, for clarity and ease of illustration, only the operation of the transmit path is described in greater detail herein.

The bus 20 includes data lines 100, address lines 110, a start of cell (Tx SOC) line 120, and a clock line 130 coupled to the modem 30 and the interface device 40. The transmit unit 44 of the interface device 40 has a cell available line (TXCLAV(a)) 140 and an enable line (TxEN(a)) 150. The receive unit 34 of the modem 30 also has a cell available line (RXCLAV(b)) 160 and an enable line (RxEN(b)) 170.

The handshaking unit 50 is adapted to drive the address line 120 and the clock line 130. The handshaking unit 50 monitors the cell available lines 140, 160 to determine of a data transfer is possible and drives the enable lines 150, 170 to facilitate the transfer. The handshaking unit 50 does not interact with the data line 100, as the data is transferred directly between the modem 30 and the interface device 40. The address line 120, cell available lines 140, 160, and enable lines 150, 170 may be collectively referred to as control lines. The handshaking unit 50 interacts with the control lines, but is independent of the data line 100.

The functions of the handshaking unit 50 are described in greater detail below in reference to FIG. 3, which is a diagram of a state machine 200 and FIG. 4, which is a timing diagram. Because only the transmit path is described, the TX and RX suffixes are omitted. Signals associated with the interface device 40 are denoted with an (a) suffix and signals associated with the modem 30 are denoted with a (b) suffix.

Figure 3:
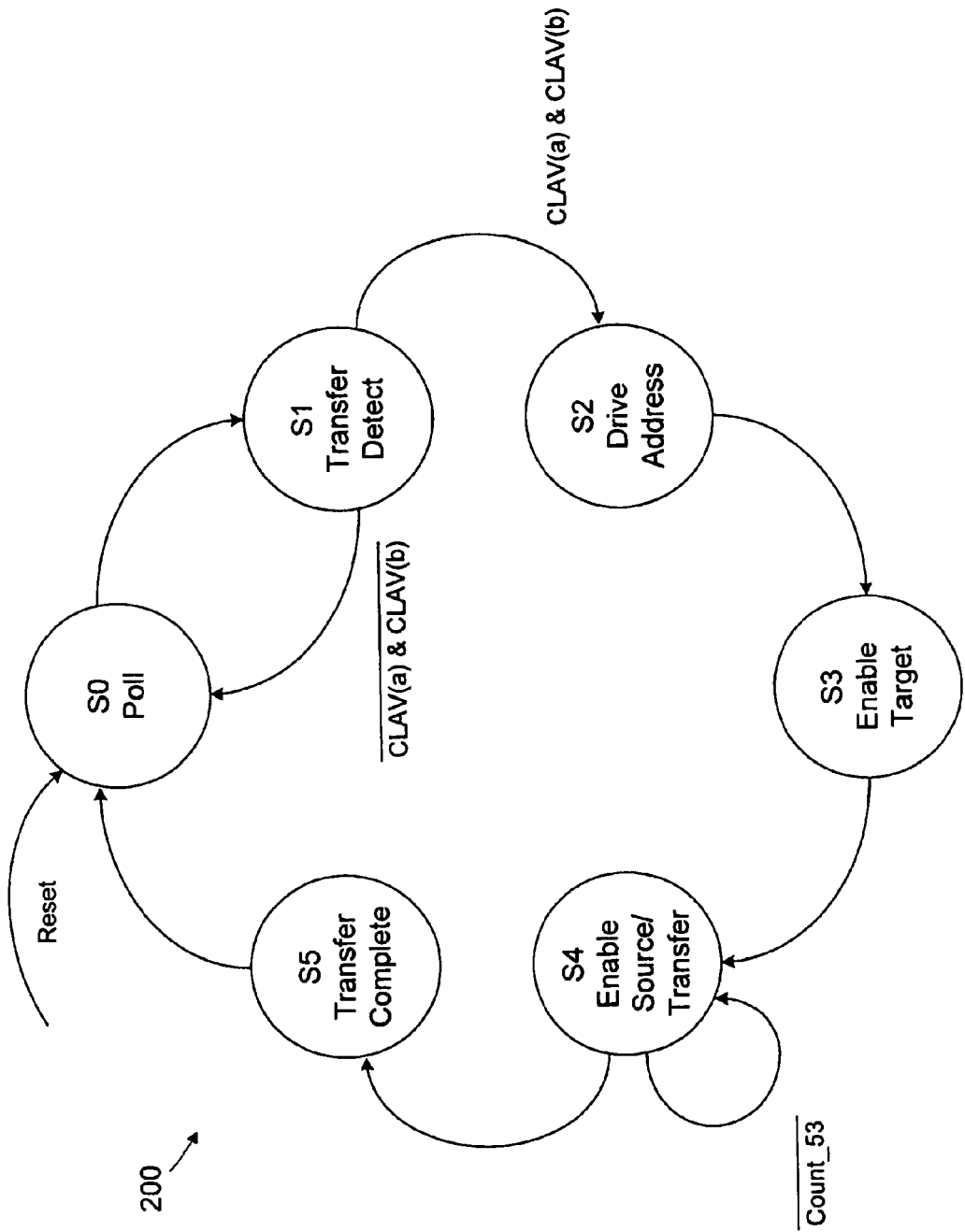
FIG. 3 is a diagram of a state machine implemented by the handshaking unit of FIG. 2.

As shown in FIG. 3, the state machine 200 includes a polling state S0, a transfer detection state S1, an address driving state S2, a target enable state S3, a source enable and transfer state S4, and a transfer complete state S5. The polling state S0 is entered after a reset condition. In the polling state S0, the handshaking unit 50 drives the shared address of one of the modems 30 and ports 41 on the address line 110. If the interface device 40 has data to send it asserts its CLAV(a) signal in response to identifying its address. If the modem 30 is capable of accepting a data transfer, it asserts its CLAV(b) signal in response to identifying its address. In the transfer detection state S1, the handshaking unit 50 drives a default address on the address line that is not associated with any of the modems 30 (e.g., 1F) and also determines if both the CLAV(a) and the CLAV(b) signals are asserted from the previously driven shared address. If both cell available signals are not enabled, the handshaking unit 50 returns to the polling state S0, increments to the next sequential shared address and polls again.

If both the CLAV(a) and the CLAV(B) signals are asserted in the transfer detection state S1, the handshaking unit 50 transitions to the address driving state S2 and drives the shared address on the address line 110 to prepare for the transfer. The handshaking unit 50 then transitions to the enable target state S3 and asserts the EN*(b) signal to prepare the target (i.e. the modem 30) for the transfer. Subsequently, the handshaking unit 50 transitions to the source enable and transfer state S4, in which the EN*(a) signal is asserted for the source of the data transfer (i.e., the interface device 40). The interface device 40 asserts the SOC signal on the line 120 to signify the start of the transfer and supplies the first header octet of the cell. The handshaking unit 50 remains in the source enable and transfer state S4 and counts until the $53^{rd}$ cycle is reached (i.e., after the transfer of the next to last payload octet in the cell). The handshaking unit 50 then transitions to the transfer complete state S5, in which the interface device 40 transfers the final payload byte of the cell, and the handshaking unit 50 deasserts the EN*(b) signal and drives the default address (1F). Finally, the handshaking unit 50 transitions back to the polling state S0, in which the EN*

(a) is deasserted and the handshaking unit 50 resumes polling to identify the next pending data transfer.

Figure 4:
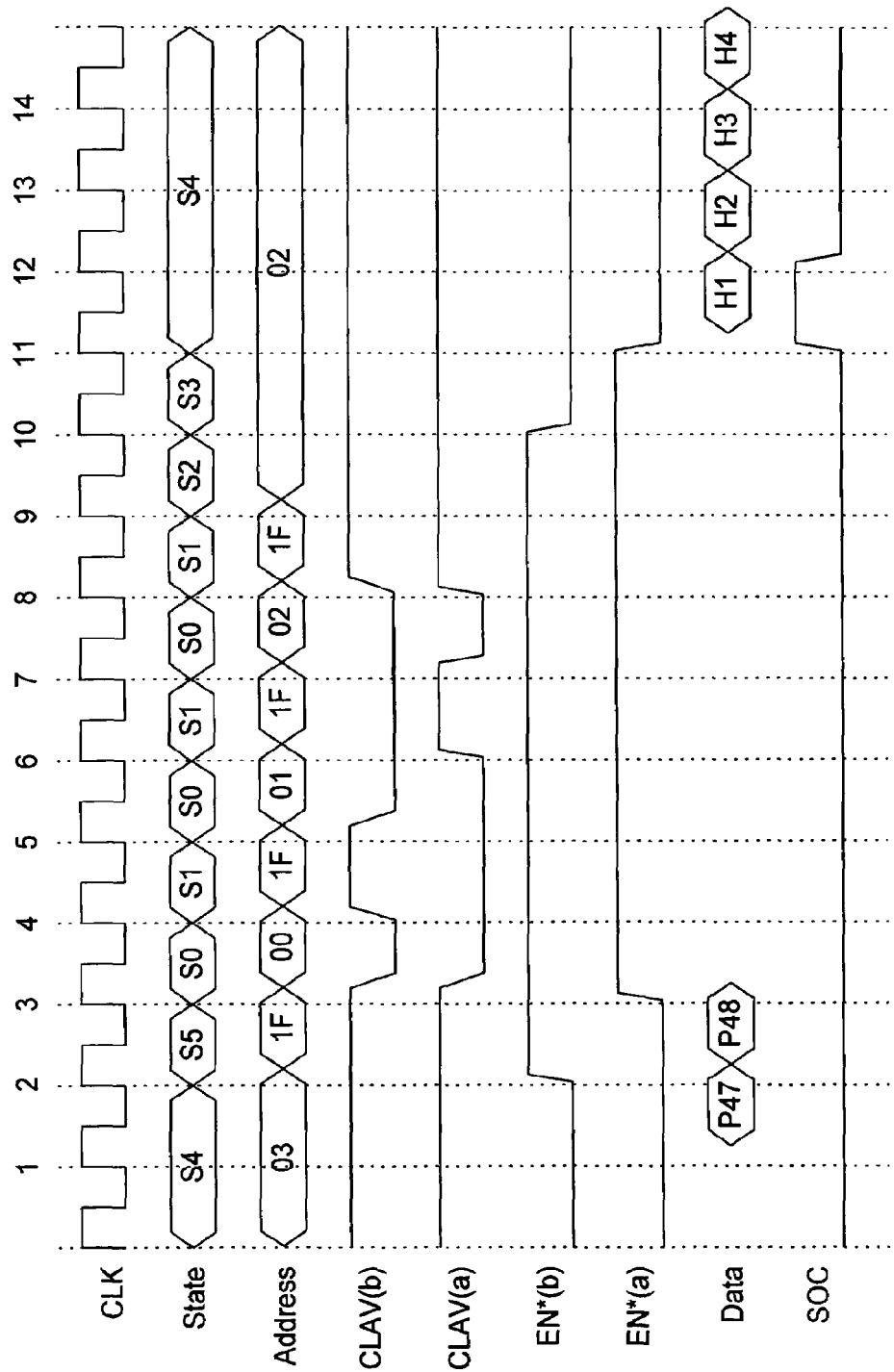
FIG. 4 is a timing diagram illustrating the transfer of data by the interfacing units of FIG. 2, as facilitated by the handshaking unit.

In the timing scenario illustrated in FIG. 4, a data transfer is finishing on the modem 30 and port 41 of the interface device 40 having the shared address of 03. During the clock 1 cycle, the P46 payload octet is transferred from the interface device 40 to the associated modem 30. The handshaking unit 50 is operating in the source enable and transfer state S4.

During the clock 2 cycle, the P47 payload octet (next to last octet in cell) is transferred, and the handshaking unit 50 transitions to the transfer complete state S5. The EN*(a) signal is deasserted and the default address (1F) is driven on the address line 110 in preparation for subsequent polling.

During the clock 3 cycle, The last payload octet, P48, is transferred. The interface device 40 and the modem 30 both float their cell available signals, CLAV(a) and CLAV(b), high in response to the default address being driven. The handshaking unit 50 drives the next sequential shared address, 00.

During the clock 4 cycle, the handshaking unit 50 drives the default address, 1F, and the modem 30 asserts its CLAV(b) signal indicating it has an empty buffer. However, because the interface device 40 has no data to send, it does not assert its CLAV(a) signal, and the handshaking unit 50 transitions back to the polling state S0 for the next polling cycle.

During the clock 5 cycle, the handshaking unit 50 drives the next shared address, 01. Subsequently, during the clock 6 cycle, the interface device 40 asserts its CLAV(a) signal to indicate that it has data to transfer. However, the modem 30 does not have an empty buffer, so it does not assert its CLAV(b) signal, and again the handshaking unit 50 transitions back to the polling state S0.

During the clock 7 cycle the handshaking unit 50 drives the next shared address, 02, and during the clock 8 cycle, both the interface device 40 and the modem 30 assert their CLAV(a) and CLAV(b) signals. Accordingly, a data transfer may be initiated, and the handshaking unit 50 transitions to the address driving state S2 to drive the shared address, 02, during the clock 9 cycle.

During the clock 10 cycle the handshaking unit 50 transitions to the target enable state S3 and asserts the EN*(b) signal to ready the modem 30. During the clock 11 cycle the handshaking unit 50 transitions to the source enable and transfer state S4 and asserts the EN*(a) signal to enable the interface device 40 to begin the transfer. The interface device 40 asserts the SOC signal and drives the first header octet, H1, on the data line 100. During the next clock cycles, the handshaking unit 50 will remain in the source enable and transfer state S4 and transfer the remaining header octets and payload octets until the next to last octet is reached. Termination of the transfer will then be conducted as described above.

The embodiments described above allow the connecting of multiple PHY devices to a common bus without the need for an expensive and complex ATM master. The handshaking unit 50 provides handshaking signals to make it appear to the PHY devices that they are transferring their data to an ATM master, while in actuality, they are transferring data directly to another PHY device.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
   at least one bus interface coupled to a bus, wherein the bus has at least one data line and at least one control line and wherein the at least one bus interface is coupled to the at least one data line and the at least one control line; and
   a handshaking unit coupled to the at least one bus interface, wherein the handshaking unit, using handshaking signals, is adapted to determine if a first device coupled to the bus and a second device coupled to the bus are capable of completing a data transfer, wherein the handshaking unit is adapted to enable the first and second devices to facilitate the data transfer.

2. The apparatus of claim 1, wherein the at least one control line comprises a first data available line coupled to the first device and a second data available line coupled to the second device, and the handshaking unit is adapted to determine that the first and second devices are capable of completing the data transfer in response to the first and second data available lines being asserted.

3. The apparatus of claim 2, wherein the at least one control line includes a first enable line coupled to the first device and a second enable line coupled to the second device, and the handshaking unit is adapted to assert the first and second enable lines to facilitate the data transfer.

4. The apparatus of claim 1, wherein the first and second devices include UTOPIA interfaces for communicating data over the bus.

5. The apparatus of claim 1, wherein the at least one control line includes a clock line and the handshaking unit is adapted to provide a clock signal to the first and second devices on the clock line.

6. The apparatus of claim 1, wherein the first and second devices comprise a first pair of devices, and wherein the bus is further coupled to a plurality of pairs of devices, each pair being configured to respond to a shared address.

7. The apparatus of claim 6, wherein the handshaking unit is adapted to sequentially poll the pairs of devices to determine if both of the devices in a particular pair are capable of completing the data transfer.

8. The apparatus of claim 7, wherein the control lines include an address line and the handshaking unit is adapted to drive an address on the address line to poll the particular pair of devices.

9. The apparatus of claim 1, wherein the first and second devices are adapted to communicate data arranged in cells.

10. The apparatus of claim 9, wherein each cell comprises an asynchronous transfer mode (ATM) cell.

11. The apparatus of claim 1, wherein the first device comprises an interface device and the second device comprises a modem.

12. The apparatus of claim 1, wherein the handshaking unit is adapted to provide the handshaking signals over the control lines without interfacing with the data line.

13. A processor, comprising:
    at least one bus interface coupled to a bus, wherein the bus has at least one data line and at least one control line and wherein the at least one bus interface is coupled to the at least one data line and the at least one control line; and
    a processing unit coupled to the at least one bus interface, wherein the processing unit is adapted to determine if a first device coupled to the bus and a second device coupled to the bus are capable of completing a data transfer using a handshaking technique including handshaking signals, wherein the processing unit is adapted to enable the first and second devices to facilitate the data transfer using the handshaking technique.

14. A non-transitory, computer readable program storage device encoded with instructions that, when executed, perform a method for interfacing first and second devices coupled to a bus having at least one data line coupled to the first and second devices and control lines, the method comprising:
   determining if the first and second devices are capable of completing a data transfer based on the control lines;
   providing handshaking signals on the control lines to enable the first and second devices; and
   transferring the data over the data line in response to the handshaking signals.

15. The non-transitory, computer readable program storage device encoded with instructions of claim 14, wherein the control lines comprise a first data available line coupled to the first device and a second data available line coupled to the second device, and determining if the first and second devices are capable of completing the data transfer comprises determining if the first and second data available lines are in an asserted state.

16. The non-transitory, computer readable program storage device encoded with instructions of claim 15, wherein the control lines include a first enable line coupled to the first device and a second enable line coupled to the second device, and providing the handshaking signals comprises asserting the first and second enable lines to facilitate the data transfer.

17. The non-transitory, computer readable program storage device encoded with instructions of claim 14, further comprising communicating with the first and second devices over the bus using a Universal Test & Operations Interface for ATM (UTOPIA) interface.

18. The non-transitory, computer readable program storage device encoded with instructions of claim 14, wherein the control lines include a clock line and providing the handshaking signals comprises providing a clock signal to the first and second devices on the clock line.

19. The non-transitory, computer readable program storage device encoded with instructions of claim 14, wherein the first and second devices comprise a first pair of devices, and wherein the method further comprises:
   providing a plurality of pairs of devices; and
   configuring each pair to respond to a shared address.

20. The non-transitory, computer readable program storage device encoded with instructions of claim 19, further comprising sequentially polling the pairs of devices to determine if both of the devices in a particular pair are capable of completing the data transfer.

21. The non-transitory, computer readable program storage device encoded with instructions of claim 20, wherein the control lines include an address line and the method further comprises driving an address on the address line to poll the particular pair of devices.

22. The non-transitory, computer readable program storage device encoded with instructions of 14, wherein transferring the data comprises transferring the data arranged in cells.

23. The non-transitory, computer readable program storage device encoded with instructions of claim 22, wherein transferring the data comprises transferring the data arranged in asynchronous transfer mode (ATM) cells.

* * * * *